United States Patent
Senda et al.

(10) Patent No.: US 10,118,999 B2
(45) Date of Patent: Nov. 6, 2018

(54) POLYLACTIC ACID FILM OR SHEET, AND PRESSURE-SENSITIVE ADHESIVE TAPE OR SHEET

(71) Applicant: NITTO DENKO CORPORATION, Osaka (JP)

(72) Inventors: Hiroki Senda, Osaka (JP); Shigeki Ishiguro, Osaka (JP); Satomi Yoshie, Osaka (JP); Yuka Sekiguchi, Osaka (JP); Rie Hayashiuchi, Osaka (JP); Asuka Endo, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 254 days.

(21) Appl. No.: 14/377,084

(22) PCT Filed: Dec. 21, 2012

(86) PCT No.: PCT/JP2012/083226
§ 371 (c)(1),
(2) Date: Aug. 6, 2014

(87) PCT Pub. No.: WO2013/118406
PCT Pub. Date: Aug. 15, 2013

(65) Prior Publication Data
US 2015/0072142 A1 Mar. 12, 2015

(30) Foreign Application Priority Data

Feb. 10, 2012 (JP) .................. 2012-027643
Feb. 10, 2012 (JP) .................. 2012-027644
Feb. 10, 2012 (JP) .................. 2012-027645

(51) Int. Cl.
*C08J 5/18* (2006.01)
*C08L 67/04* (2006.01)
(Continued)

(52) U.S. Cl.
CPC ................. *C08J 5/18* (2013.01); *B29C 43/24* (2013.01); *B29C 43/52* (2013.01); *C08K 5/103* (2013.01);
(Continued)

(58) Field of Classification Search
CPC .................... C08L 67/04; C08L 27/18; C08G 63/02–63/08
See application file for complete search history.

(56) References Cited

U.S. PATENT DOCUMENTS 5,766,748 A    6/1998  Ikado et al.
5,849,401 A *  12/1998 El-Afandi ............... B32B 27/08
                                                    156/244.11
(Continued)

FOREIGN PATENT DOCUMENTS

CN    103228713 A   7/2013
EP    1270659 A1    1/2003
(Continued)

OTHER PUBLICATIONS

Restriction Requirement issued with respect to U.S. Appl. No. 14/377,007, dated May 19, 2016.
(Continued)

*Primary Examiner* — Scott R. Walshon
(74) *Attorney, Agent, or Firm* — Greenblum & Bernstein, P.L.C.

(57) ABSTRACT

Polylactic acid film or sheet having tear strength so as not to break or tear during, for example, production or processing of the film or sheet or winding thereof into a roll, and causing neither melt nor deformation at high temperatures more than 100° C. In the polylactic acid film or sheet, the tear strength is not less than 100 N/mm when the film or sheet is torn at least in a flow direction (MD), a rate of dimensional change due to heating is not more than ±3% in (Continued)

the flow direction (MD) and a transverse direction (TD), and a rate of dimensional change due to loaded heating is not more than ±3% in the flow direction (MD).

9 Claims, 1 Drawing Sheet

(51) Int. Cl.
| | |
|---|---|
| B29C 43/24 | (2006.01) |
| C08K 5/103 | (2006.01) |
| B29C 43/52 | (2006.01) |
| C09J 7/25 | (2018.01) |
| C08L 51/06 | (2006.01) |
| B29K 21/00 | (2006.01) |
| B29K 67/00 | (2006.01) |
| B29K 105/00 | (2006.01) |
| B29K 227/18 | (2006.01) |
| B29L 7/00 | (2006.01) |
| B29L 31/34 | (2006.01) |
| B29K 23/00 | (2006.01) |
| B29K 25/00 | (2006.01) |
| B29K 27/18 | (2006.01) |
| B29K 33/00 | (2006.01) |
| B29K 96/02 | (2006.01) |

(52) U.S. Cl.
CPC .............. *C08L 67/04* (2013.01); *C09J 7/25* (2018.01); *B29K 2021/00* (2013.01); *B29K 2023/12* (2013.01); *B29K 2025/06* (2013.01); *B29K 2027/18* (2013.01); *B29K 2033/12* (2013.01); *B29K 2067/046* (2013.01); *B29K 2096/02* (2013.01); *B29K 2105/0005* (2013.01); *B29K 2105/0067* (2013.01); *B29K 2105/0088* (2013.01); *B29K 2105/251* (2013.01); *B29K 2223/12* (2013.01); *B29K 2227/18* (2013.01); *B29K 2995/0041* (2013.01); *B29K 2995/0094* (2013.01); *B29L 2007/008* (2013.01); *B29L 2031/3468* (2013.01); *C08J 2367/04* (2013.01); *C08L 51/06* (2013.01); *C09J 2201/122* (2013.01); *C09J 2201/606* (2013.01); *C09J 2203/306* (2013.01); *C09J 2421/006* (2013.01); *C09J 2423/106* (2013.01); *C09J 2427/006* (2013.01); *C09J 2451/006* (2013.01); *C09J 2467/005* (2013.01); *C09J 2467/006* (2013.01); *Y10T 428/254* (2015.01); *Y10T 428/28* (2015.01); *Y10T 428/2839* (2015.01)

(56) References Cited

U.S. PATENT DOCUMENTS

| | | | |
|---|---|---|---|
| 5,851,662 A * | 12/1998 | Suzuki | .................. C08F 220/30 428/343 |
| 6,117,928 A | 9/2000 | Hiltunen et al. | |
| 6,235,825 B1 | 5/2001 | Yoshida et al. | |
| 6,720,374 B2 | 4/2004 | Sashida et al. | |
| 2002/0151618 A1 | 10/2002 | Bastioli et al. | |
| 2003/0216496 A1 | 11/2003 | Mohanty et al. | |
| 2005/0131120 A1 | 6/2005 | Flexman | |
| 2008/0188593 A1 | 8/2008 | Bastioli et al. | |
| 2009/0318631 A1 | 12/2009 | Narita et al. | |
| 2010/0129582 A1 | 5/2010 | Nagashima et al. | |
| 2010/0151219 A1 | 6/2010 | Busch et al. | |
| 2011/0201746 A1 | 8/2011 | Ishiguro et al. | |
| 2011/0283443 A1 | 11/2011 | Simpson | |
| 2011/0293877 A1 | 12/2011 | Wolters-Zuur | |
| 2012/0021202 A1 | 1/2012 | Senda et al. | |
| 2013/0236723 A1 | 9/2013 | Ishiguro et al. | |
| 2014/0377540 A1 | 12/2014 | Ishiguro et al. | |
| 2015/0004404 A1 | 1/2015 | Senda et al. | |
| 2015/0072142 A1 | 3/2015 | Senda et al. | |

FOREIGN PATENT DOCUMENTS

| | | | |
|---|---|---|---|
| EP | 2 345 691 A1 | 7/2011 | |
| JP | 2005-036172 A | 2/2005 | |
| JP | 2006-070224 A | 3/2006 | |
| JP | 2007-130893 A | 5/2007 | |
| JP | 2007-130894 A | 5/2007 | |
| JP | 2007-277383 A | 10/2007 | |
| JP | 2008-013295 A | 1/2008 | |
| JP | 2008-069299 A | 3/2008 | |
| JP | 2008069299 A * | 3/2008 | .............. C08L 67/04 |
| JP | 2008-088402 A | 4/2008 | |
| JP | 2009-062410 A | 3/2009 | |
| JP | 2009-173715 A | 8/2009 | |
| JP | 2010-106272 A | 5/2010 | |
| JP | 2011-168716 A | 9/2011 | |
| JP | 2011-252049 A | 12/2011 | |
| JP | 2013-163763 A | 8/2013 | |
| JP | 2013-163764 A | 8/2013 | |
| WO | 2008/013295 A1 | 1/2008 | |
| WO | 2010/038833 A1 | 4/2010 | |
| WO | 2011/093302 A1 | 8/2011 | |
| WO | 2012/017095 A1 | 2/2012 | |
| WO | 2012/070526 A1 | 5/2012 | |

OTHER PUBLICATIONS

Japanese Office Action issued with respect to application No. 2012-027645, dated Jun. 30, 2015.
Japanese Office Action issued with respect to application No. 2012-027644, dated Jun. 30, 2015.
International search report issued with respect to application No. PCT/JP2012/083226, dated Mar. 12, 2013.
Chinese Office Action issued with respect to application No. 201280069437.X, dated Feb. 24, 2016.
Chinese Office Action issued with respect to Application No. 201280069437.X, dated Nov. 7, 2016.
Chinese Office Action issued with respect to Application No. 201280069435.0, dated Nov. 16, 2016.
Chinese Office Action issued with respect to Application No. 201280069498.6, dated Nov. 16, 2016.
U.S. Office Action issued with respect to U.S. Appl. No. 14/377,007, dated Sep. 9, 2016.
U.S. Office Action issued with respect to U.S. Appl. No. 14/377,026, dated Aug. 31, 2016.

* cited by examiner

[Fig. 1]
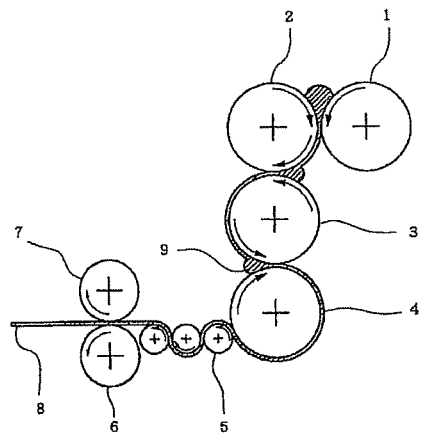
[Fig. 2]
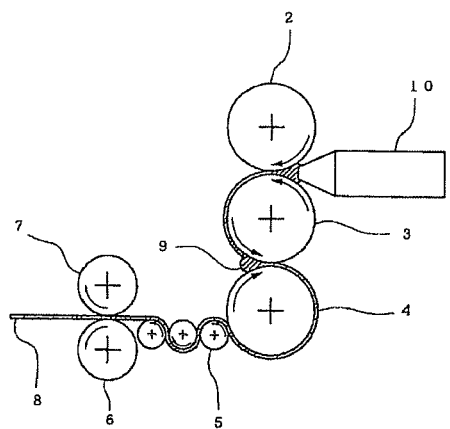

POLYLACTIC ACID FILM OR SHEET, AND PRESSURE-SENSITIVE ADHESIVE TAPE OR SHEET

TECHNICAL FIELD

The present invention relates to a polylactic acid film or sheet, and more specifically relates to a polylactic acid film or sheet having high heat resistance and breakage/tear resistance during production and processing.

The present invention also relates to a pressure-sensitive adhesive tape or sheet, and more specifically relates to a pressure-sensitive adhesive tape or sheet including a substrate composed of a polylactic acid film or sheet having high heat resistance and breakage/tear resistance during production and processing.

BACKGROUND ART

Polylactic acid is a plant-derived biomass polymer, and has been receiving attention as a resin alternative to petroleum-derived polymers. Polylactic acid, which is a highly elastic and strong polymer, unfortunately, lacks toughness and has low impact resistance, low tear resistance, and low flexibility. Polylactic acid has a low rate of crystallization, and barely shows crystal growth in ordinary crystal growth. Although the melting point is approximately 170° C., polylactic acid thermally deforms at temperatures of not less than the glass transition temperature, i.e., not less than 60° C., and cannot keep a film shape. Then, to improve the heat resistance of polylactic acid resin films, several methods have been heretofore suggested.

As the measures against these problems, a method of blending polylactic acid with a soft and heat resistant polymer to improve the heat resistance of a polylactic acid resin film has been suggested (PTL 1).

Alternatively, a method of adding aliphatic polyester/core-shell type rubber to polylactic acid, and monoaxially or biaxially drawing a film formed of the prepared polylactic acid has been suggested (PTL 2). Both methods can attain impact resistance and heat resistance at the same time. Unfortunately, blending of large amounts of the petroleum-derived polymer and additives significantly reduces the ratio of the plant-derived component (degree of biomass).

A technique of giving flexibility and heat resistance to a polylactic acid film has been suggested, in which crystallization of a resin composition comprising polylactic acid, a plasticizer, and a nucleator is promoted in a heat treatment step subsequent to a step of molding a film (PTL 3). Unfortunately, in this method, addition of the plasticizer may cause bleed-out, and an effect of improving tear resistance is little while an effect of improving flexibility is attained. If such a film or sheet is used as a substrate for pressure-sensitive adhesive tapes or the like, such pressure-sensitive adhesive tapes or the like may be broken or torn during the production or processing thereof.

CITATION LIST

Patent Literature

PTL 1: Japanese Patent Laid-Open No. 2006-70224
PTL 2: Japanese Patent Laid-Open No. 2009-173715
PTL 3: Japanese Patent No. 4699180

SUMMARY OF INVENTION

Technical Problem

Then, an object of the present invention is to provide a polylactic acid film or sheet having tear strength so as not to break or tear during, for example, production or processing of the film or sheet or winding thereof into a roll, and causing neither melt nor deformation at high temperatures more than 100° C. Another object of the present invention is to provide a pressure-sensitive adhesive tape or sheet including a substrate composed of such a polylactic acid film or sheet.

Solution to Problem

The present inventors, who have conducted extensive research to attain the above objects, found that the problems above can be solved by use of a film or sheet which is a polylactic acid resin film or sheet having a tear strength of not less than a predetermined value and having a rate of dimensional change due to heating (%) of not more than a predetermined value and a rate of dimensional change due to loaded heating (%) of not more than a predetermined value, and have completed the present invention.

Namely, the present invention provides
a polylactic acid film or sheet comprising polylactic acid (A),
wherein a tear strength (according to JIS K7128-3: Plastics—Film and Sheeting—Determination of Tear Resistance, Part 3: Right angled tear method) is not less than 100 N/mm when the film or sheet is torn at least in a flow direction (machine direction: MD),
the film or sheet stored under an atmosphere at 100° C. for 1 minute has a rate of dimensional change due to heating of not more than ±3% in the flow direction (MD) and a transverse direction (TD), the rate of dimensional change due to heating being determined by Expression (1):

$$\text{rate of dimensional change due to heating (\%)} = (L2-L1)/L1 \times 100 \quad (1)$$

where L1 represents a gauge length before a test, and L2 represents a gauge length after the test, and
the film or sheet stored under an atmosphere at 100° C. for 1 minute while a load of 300 g/mm$^2$ is applied in the flow direction (MD) has a rate of dimensional change due to loaded heating of not more than ±3% in the flow direction (MD), the rate of dimensional change due to loaded heating being determined by Expression (2):

$$\text{rate of dimensional change due to loaded heating (\%)} = (L4-L3)/L3 \times 100 \quad (2)$$

where L3 represents a gauge length before a test, and L4 represents a gauge length after the test.

The polylactic acid film or sheet may further comprise a reforming agent (E). The polylactic acid film or sheet may comprise a polyglycerol fatty acid ester and/or polyglycerol condensed hydroxy fatty acid ester (a) as the reforming agent (E) such that the weight ratio of the polylactic acid (A) to the polyglycerol fatty acid ester and/or polyglycerol condensed hydroxy fatty acid ester (a) is 99:1 to 80:20 ((A):total amount of (a)).

The polylactic acid film or sheet may comprise a core-shell-structured polymer (b) composed of a particulate rubber and a graft layer formed on the outside of the rubber as the reforming agent (E) such that the weight ratio of the polylactic acid (A) to the core-shell-structured polymer (b) composed of a particulate rubber and a graft layer formed on the outside of the rubber is 99:1 to 80:20 ((A):(b)).

The polylactic acid film or sheet may comprise a soft aliphatic polyester (c) as the reforming agent (E) such that the weight ratio of the polylactic acid (A) to the soft aliphatic polyester (c) is 95:5 to 60:40 ((A):(c)).

The polylactic acid film or sheet may further comprise 0.1 to 10 parts by weight of an acidic functional group-modified olefin polymer (B) based on 100 parts by weight of the polylactic acid (A) (or a composition comprising the polylactic acid (A) and the reforming agent (E) when the reforming agent (E) is contained), the acidic functional group-modified olefin polymer (B) having an acid value of 10 to 70 mgKOH/g and a weight average molecular weight of 10000 to 80000. The acidic functional group of the acidic functional group-modified olefin polymer (B) may be an acid anhydride group.

The polylactic acid film or sheet may further comprise 0.5 to 15 parts by weight of a fluorine-containing polymer (C) based on 100 parts by weight of the polylactic acid (A) (or a composition comprising the polylactic acid (A) and the reforming agent (E) when the reforming agent (E) is contained). The fluorine-containing polymer (C) may be a tetrafluoroethylene polymer.

The polylactic acid film or sheet may further comprise 0.1 to 15 parts by weight of a crystallization promoter (D) based on 100 parts by weight of the polylactic acid (A) (or a composition comprising the polylactic acid (A) and the reforming agent (E) when the reforming agent (E) is contained).

The polylactic acid film or sheet may be a film or sheet formed by a melt film forming method such as calendering.

The present invention provides a pressure-sensitive adhesive tape or sheet having a pressure-sensitive adhesive layer on at least one surface of a substrate, wherein the substrate is composed of the polylactic acid film or sheet.

The present invention provides a method of producing a polylactic acid film or sheet wherein a resin composition comprising polylactic acid (A) is formed into a film by a melt film forming method, the method comprising:

a melt film forming step of melt forming the resin composition into a film, a cooling solidifying step of cooling and solidifying the resin composition after the melt film forming step to prepare a film or sheet, and a crystallization promoting step of heating the film or sheet after the cooling solidifying step to promote crystallization of the film or sheet, wherein a resin temperature in the melt film forming step is within the range of (Tm)−15° C. to (Tm)+15° C. where Tm represents a melting temperature of the resin composition during raising of temperature, and in at least part of the crystallization promoting step, crystallization of the film or sheet is promoted within the temperature range of (Tc)+10° C. to (Tc)+50° C. where Tc represents a crystallization temperature of the resin composition during the raising of temperature.

The method of producing a polylactic acid film or sheet may comprise a residual stress relaxing step after the melt film forming step and before the cooling solidifying step, wherein in the residual stress relaxing step, the resin composition may be kept within the temperature range of (Tm)−70° C. to (Tm)−20° C.

The resin composition may further comprise a reforming agent (E).

The resin composition may comprise polyglycerol fatty acid ester and/or polyglycerol condensed hydroxy fatty acid ester (a) as the reforming agent (E) such that the weight ratio of the polylactic acid (A) to the polyglycerol fatty acid ester and/or polyglycerol condensed hydroxy fatty acid ester (a) is 99:1 to 80:20 ((A):total amount of (a)).

The resin composition may comprise a core-shell-structured polymer (b) composed of a particulate rubber and a graft layer formed on the outside of the rubber as the reforming agent (E) such that the weight ratio of the polylactic acid (A) to the core-shell-structured polymer (b) composed of a particulate rubber and a graft layer formed on the outside of the rubber is 99:1 to 80:20 ((A):(b)).

The resin composition may comprise a soft aliphatic polyester (c) as the reforming agent (E) such that the weight ratio of the polylactic acid (A) to the soft aliphatic polyester (c) is 95:5 to 60:40 ((A):(c)).

The resin composition may further comprise 0.1 to 10 parts by weight of an acidic functional group-modified olefin polymer (B) based on 100 parts by weight of the polylactic acid (A) (or a composition comprising the polylactic acid (A) and the reforming agent (E) when the reforming agent (E) is contained), the acidic functional group-modified olefin polymer (B) having an acid value of 10 to 70 mgKOH/g and a weight average molecular weight of 10000 to 80000. The acidic functional group of the acidic functional group-modified olefin polymer (B) may be an acid anhydride group.

The resin composition may further comprise 0.5 to 15 parts by weight of a fluorine-containing polymer (C) based on 100 parts by weight of the polylactic acid (A) (or a composition comprising the polylactic acid (A) and the reforming agent (E) when the reforming agent (E) is contained). The fluorine-containing polymer (C) may be a tetrafluoroethylene polymer.

The resin composition may further comprise 0.1 to 15 parts by weight of a crystallization promoter (D) based on 100 parts by weight of the polylactic acid (A) (or a composition comprising the polylactic acid (A) and the reforming agent (E) when the reforming agent (E) is contained).

The melt film forming method may be calendering.

The present invention provides a method of producing a pressure-sensitive adhesive tape or sheet having a pressure-sensitive adhesive layer on at least one surface of a substrate, wherein the substrate is composed of a polylactic acid film or sheet prepared by the method of producing a polylactic acid film or sheet.

Advantageous Effects of Invention

The polylactic acid film or sheet according to the present invention does not melt or deform at high temperatures more than 100° C. Moreover, the polylactic acid film or sheet according to the present invention keeps its intrinsic rigidity and does not break or tear when tension is applied to the film or sheet during, for example, production or processing thereof or winding thereof into a roll.

The substrate for the pressure-sensitive adhesive tape or sheet according to the present invention does not melt or deform at high temperatures more than 100° C. The substrate keeps its intrinsic rigidity and does not break or tear when tension is applied to the substrate during, for example, production or processing of the pressure-sensitive adhesive tape or sheet or winding thereof into a roll.

BRIEF DESCRIPTION OF DRAWINGS

FIG. 1 is a schematic view showing an example of a calendering film forming machine used in production of the polylactic acid film or sheet (substrate for the pressure-sensitive adhesive tape or sheet) according to the present invention.

FIG. 2 is a schematic view showing an example of a polishing film forming machine used in production of the polylactic acid film or sheet (substrate for the pressure-sensitive adhesive tape or sheet) according to the present invention.

DESCRIPTION OF EMBODIMENTS

[Substrate for Pressure-sensitive Adhesive Tape or Sheet]

The polylactic acid film or sheet used as a substrate for the pressure-sensitive adhesive tape or sheet according to the present invention is a resin film or sheet comprising polylactic acid (A). The raw material monomer for polylactic acid, lactic acid, has asymmetric carbon atoms, and has optical isomers of L-form and D-form. Polylactic acid (A) used in the present invention is a polymer including L-form lactic acid as the main component. As a smaller content of D-form lactic acid is mixed as impurities during production, the resultant polymer has higher crystallinity and a higher melting point. A raw material having high purity of L-form is preferably used, and those having a purity of L-form of not less than 95% are more preferably used. Polylactic acid (A) may contain other copolymerization components in addition to lactic acid.

Examples of the other copolymerization components include polyol compounds such as ethylene glycol, propylene glycol, 1,3-propanediol, butanediol, pentanediol, neopentyl glycol, hexanediol, heptanediol, octanediol, nonanediol, decanediol, 1,4-cyclohexanedimethanol, glycerol, pentaerythritol, polyethylene glycol, polypropylene glycol, polytetramethylene glycol, and bisphenol A; polyvalent carboxylic acids such as oxalic acid, malonic acid, glutaric acid, adipic acid, sebacic acid, azelaic acid, dodecanedione acid, cyclohexanedicarboxylic acid, terephthalic acid, isophthalic acid, phthalic acid, naphthalenedicarboxylic acid, bis(p-carboxyphenyl)methane, anthracenedicarboxylic acid, 4,4'-diphenyletherdicarboxylic acid, 5-sodiumsulfoisophthalic acid, and 5-tetrabutylphosphoniumisophthalic acid; hydroxycarboxylic acids such as glycolic acid, hydroxypropionic acid, hydroxybutyric acid, hydroxyvaleric acid, hydroxycaproic acid, and hydroxybenzoic acid; and lactones such as propiolactone, valerolactone, caprolactone, undecalactone, and 1,5-oxepan-2-one. These copolymerization components are contained in a proportion of preferably 0 to 30 mol %, more preferably 0 to 10 mol % based on the total monomer components that form the polylactic acid (A).

The weight average molecular weight of the polylactic acid (A) is, for example, 10000 to 400000, preferably 50000 to 300000, more preferably 80000 to 200000. The melt flow rate [JIS K-7210 (test condition 4)] of the polylactic acid (A) at 190° C. and a load of 21.2 N is, for example, 0.1 to 50 g/10 min, preferably 0.2 to 20 g/10 min, more preferably 0.5 to 10 g/10 min, particularly preferably 1 to 7 g/10 min. An excessively high value of the melt flow rate may reduce the mechanical properties and heat resistance of the prepared film or sheet. An excessively low value of the melt flow rate may excessively increase load during film formation.

In the present invention, the "weight average molecular weight" refers to the value measured by gel permeation chromatography (GPC) (in terms of polystyrene). The measurement conditions for GPC are as follows:

column: TSKgel SuperHZM-H/HZ2000/HZ1000
column size: 4.6 mm I.D.×150 mm
eluent: chloroform
flow rate: 0.3 ml/min
detector: RI
column temperature: 40° C.
amount of injection: 10 μl Polylactic acid can be prepared by any method. Representative examples of the production method include lactidation and direct polymerization. Lactidation is a method for preparing high molecular weight polylactic acid in which lactic acid is heated and dehydration condensed to prepare low molecular weight polylactic acid; the low molecular weight polylactic acid is pyrolyzed under reduced pressure to prepare a cyclic dimer of lactic acid, lactide; and the lactide is subjected to ring-opening polymerization in the presence of a metal salt catalyst such as tin(II) octanoate. Direct polymerization is a method for directly preparing polylactic acid in which lactic acid is heated in a solvent such as diphenyl ether under reduced pressure to be polymerized while the moisture content is being removed to suppress hydrolysis.

Commercially available products can be used as the polylactic acid (A). Examples of commercially available products include trade names "LACEA H-400" and "LACEA H-100" (made by Mitsui Chemicals, Inc.), and trade names "Terramac TP-4000" and "Terramac TE-4000" (made by Unitika Limited). Any polylactic acid (A) prepared by a known standard polymerization method (such as emulsion polymerization and solution polymerization) can be used.

The content of the polylactic acid (A) in the polylactic acid film or sheet is usually not less than 60% by weight, preferably not less than 70% by weight, more preferably not less than 80% by weight, particularly preferably not less than 85% by weight from the viewpoint of increase in the degree of biomass. The upper limit of the content of the polylactic acid (A) is, for example, 97% by weight, preferably 95% by weight, more preferably 93% by weight. Herein, the degree of biomass refers to the proportion of the dry weight of biomass used to the dry weight of the film or sheet. Biomass refers to regenerative organic resources derived from living organisms excluding fossil resources.

In the present invention, the polylactic acid film or sheet used to form a substrate for the pressure-sensitive adhesive tape or sheet may comprise an acidic functional group-modified olefin polymer (B). The acidic functional group-modified olefin polymer (B) compounded with the polylactic acid (A) can give rolling lubrication. This property enables the polylactic acid film or sheet to readily remove from the surfaces of metal rolls when the polylactic acid film or sheet is melt with a calendering film forming machine or the like and passed through between the metal rolls, leading to smooth film formation. These acidic functional group-modified olefin polymers (B) may be used singly or in combinations of two or more.

Examples of the acidic functional group of the acidic functional group-modified olefin polymer (B) include a carboxyl group or derivative groups thereof. Examples of the derivative groups of the carboxyl group include groups chemically derived from a carboxyl group such as acid anhydride groups, ester groups, amide groups, imide groups, and cyano groups of carboxylic acid. Among these, carboxylic anhydride groups are preferable.

The acidic functional group-modified olefin polymer (B) is prepared by grafting an unsaturated compound containing the "acidic functional group" (hereinafter abbreviated to "acidic functional group-containing unsaturated compound" in some cases) to an unmodified polyolefin polymer.

Examples of the unmodified polyolefin polymer include polyolefins, such as high density polyethylene, middle density polyethylene, low density polyethylene, polypropylene, polybutene, poly-4-methylpentene-1, copolymers of ethylene and α-olefin, and copolymers of propylene and α-olefin, or oligomers thereof; polyolefin elastomers, such as ethylene-propylene rubbers, ethylene-propylene-diene copolymer rubbers, butyl rubbers, butadiene rubbers, low crystalline ethylene-propylene copolymers, propylene-butene copolymers, ethylene-vinyl ester copolymers, ethylene-methyl (meth)acrylate copolymers, ethylene-ethyl (meth) acrylate copolymers, ethylene-maleic anhydride copolymers, and blends of polypropylene and ethylene-propylene rubbers; and mixtures thereof. Among these, polypropylene, copolymers of propylene and α-olefin, low density polyethylene, and oligomers thereof are preferable, and polypropylene, copolymers of propylene and α-olefin, and oligomers thereof are particularly preferable. Examples of the "oligomers" include those prepared from the corresponding polymers by a molecular weight degradation method using pyrolysis. The oligomers can also be prepared by polymerization.

Examples of the acidic functional group-containing unsaturated compound include carboxyl group-containing unsaturated compounds and unsaturated compounds containing derivative groups of a carboxyl group.

Examples of the carboxyl group-containing unsaturated compound include maleic acid, itaconic acid, chloroitaconic acid, chloromaleic acid, citraconic acid, and (meth)acrylic acid. Examples of unsaturated compounds containing derivative groups of a carboxyl group include carboxylic anhydride group-containing unsaturated compounds such as maleic anhydride, itaconic anhydride, chloroitaconic anhydride, chloromaleic anhydride, and citraconic anhydride; (meth)acrylates such as methyl (meth)acrylate, glycidyl (meth)acrylate, and 2-hydroxyethyl (meth)acrylate; and (meth)acrylamide, maleimide, and (meth)acrylonitrile. Among these, the carboxyl group-containing unsaturated compounds and the carboxylic anhydride group-containing unsaturated compounds are preferable, acid anhydride group-containing unsaturated compounds are more preferable, and maleic anhydride is particularly preferable.

It is important that the weight average molecular weight of the acidic functional group-modified olefin polymer (B) is 10000 to 80000, preferably 15000 to 70000, more preferably 20000 to 60000. A weight average molecular weight less than 10000 will cause bleed-out after molding of the film or sheet while a weight average molecular weight more than 80000 will cause the polymer (B) to separate from the polylactic acid (A) during roll kneading. Herein, bleed-out refers to a phenomenon in which a low molecular weight component comes out of the surface of the film or sheet after molding of the film or sheet as the time passes.

The acidic functional group in the acidic functional group-modified olefin polymer (B) may modify in any modified proportion or bond to any position of the olefin polymer. The acid value of the acidic functional group-modified olefin polymer (B) is usually 10 to 70 mgKOH/g, preferably 20 to 60 mgKOH/g. An acid value less than 10 mgKOH/g cannot attain the effect of improving rolling lubrication while an acid value more than 70 mgKOH/g will cause plate out to the roll. Herein, the plate out to the roll refers to a phenomenon in which during melt film forming of a resin composition using a metal roll, components compounded with the resin composition or oxidized, decomposed, combined, or degraded products thereof, etc. adhere to or deposit on the surface of the metal roll. In the present invention, the "acid value" refers to the value measured according to JIS K0070-1992: Neutralization Titration.

The acidic functional group-modified olefin polymer (B) is prepared by reacting the unmodified polyolefin polymer with the acidic functional group-containing unsaturated compound in the presence of an organic peroxide. Any organic peroxide used as a standard initiator in radical polymerization can be used. The reaction can be performed by any of a solution method and a melting method. In the solution method, the acidic functional group-modified olefin polymer (B) can be prepared by dissolving a mixture of the unmodified polyolefin polymer and the acidic functional group-containing unsaturated compound with an organic peroxide in an organic solvent, and heating the mixture. The reaction temperature is preferably approximately 110 to 170° C.

In the melting method, the acidic functional group-modified olefin polymer (B) can be prepared by mixing a mixture of the unmodified polyolefin polymer and the acidic functional group-containing unsaturated compound with an organic peroxide, and reacting the mixture by melt mixing. Melt mixing can be performed with a variety of mixers such as extruders, Brabenders, kneaders, and Banbury mixers. The kneading temperature is usually within the temperature range of the melting point of the unmodified polyolefin polymer to 300° C.

The acidic functional group-modified olefin polymer (B) is preferably maleic anhydride modified polypropylene. Commercially available products can be used as the acidic functional group-modified olefin polymer (B), and examples thereof include trade names "Umex 1010" (maleic anhydride group-modified polypropylene, acid value: 52 mgKOH/g, weight average molecular weight: 32000, modified proportion: 10% by weight), "Umex 1001" (maleic anhydride group-modified polypropylene, acid value: 26 mgKOH/g, weight average molecular weight: 49000, modified proportion: 5% by weight), "Umex 2000" (maleic anhydride group-containing modified polyethylene, acid value: 30 mgKOH/g, weight average molecular weight: 20000, modified proportion: 5% by weight) made by Sanyo Chemical Industries, Ltd.

The acidic functional group-modified olefin polymer (B) in the polylactic acid film or sheet can be used in any content. For example, 0.1 to 10 parts by weight of the acidic functional group-modified olefin polymer (B) having an acid value of 10 to 70 mgKOH/g and a weight average molecular weight of 10000 to 80000 may be contained based on 100 parts by weight of the polylactic acid (A) (or a composition comprising the polylactic acid (A) and the reforming agent (E) when the reforming agent (E) is contained). The content thereof is preferably 0.1 to 5 parts by weight, particularly preferably 0.3 to 3 parts by weight from the viewpoint of maintenance of the effect of rolling lubrication without plate out to the roll and maintenance of the degree of biomass. Less than 0.1 parts by weight of the acidic functional group-modified olefin polymer (B) is difficult to attain the effect of improving rolling lubrication while more than 10 parts by weight of the acidic functional group-modified olefin polymer (B) cannot attain the effect according to the amount of addition, and reduces the degree of biomass.

In the present invention, the polylactic acid film or sheet used to form the substrate may contain a fluorine-containing polymer (C) in addition to the components above. The fluorine-containing polymer (C) is used as a melt tension adjuster or a crystallization promoter, for example. Examples of the fluorine-containing polymer (C) include tetrafluoroethylene polymers, polychlorotrifluoroethylene, polyvinylidene fluoride, and polyvinyl fluoride. These fluorine-containing polymers (C) may be used singly or in combinations of two or more. Particularly, tetrafluoroethylene polymer (C') can be suitably used as the fluorine-containing polymer (C).

The tetrafluoroethylene polymer (C') may be a homopolymer of tetrafluoroethylene or a copolymer of tetrafluoroethylene and an additional monomer. Examples of the tetrafluoroethylene polymer (C') include polytetrafluoroethylene, perfluoroalkoxyalkane (copolymers of tetrafluoroethylene and perfluoroalkylvinylether), perfluoroethylene propene copolymers (copolymers of tetrafluoroethylene and hexafluoropropylene), ethylene-tetrafluoroethylene copolymers, and tetrafluoroethylene-perfluorodioxol copolymers. Among these, polytetrafluoroethylene is preferable. These tetrafluoroethylene polymers (C') may be used singly or in combinations of two or more.

If the fluorine-containing polymer (C) is compounded with the polylactic acid (A)-containing resin composition, melt tension is improved and melt viscosity is increased. For example, in film formation with a calender roll, these properties can prevent elongation and peel-off failure, which might be caused when the resin composition formed into a film is removed from the roll. Particularly, fluorine-containing polymers such as the tetrafluoroethylene polymer (C') serve as a nucleator for the polylactic acid (A). Such polymers can further promote crystallization of the polylactic acid (A) by setting the temperature of the resin composition immediately after film formation at a temperature close to the crystallization temperature thereof. As above, the fluorine-containing polymer (C) [particularly tetrafluoroethylene polymer (C')] compounded can promote crystallization of the polylactic acid (A), enhancing ΔHc' of the polylactic acid film or sheet.

It seems that the action as a nucleator of the tetrafluoroethylene polymer (C') on the polylactic acid (A) depends on the crystal structure of the tetrafluoroethylene polymer (C'). According to the determination by wide angle X ray diffraction, the crystal lattice of polylactic acid had a plane interval of 4.8 angstroms while tetrafluoroethylene polymer (C') had a plane interval of 4.9 angstroms. From this, it is considered that the tetrafluoroethylene polymer (C') has an epitaxy effect, and can serve as a nucleator for the polylactic acid (A). Herein, the epitaxy effect refers to a manner of growth in which the polylactic acid (A) crystal grows on the surface of the tetrafluoroethylene polymer (C') to align the polylactic acid (A) along the crystal planes on the crystal surface of the tetrafluoroethylene polymer (C').

The plane interval of the tetrafluoroethylene polymer (C') and that of a copolymer of tetrafluoroethylene and an additional monomer both are governed by the form of crystal of a tetrafluoroethylene portion, and the plane intervals thereof are the same. Accordingly, the copolymer can contain the additional monomer component in any content to the extent that the form of crystal of polytetrafluoroethylene can be kept and physical properties do not change much. Desirably, the proportion of the additional monomer component in the tetrafluoroethylene polymer (C') is usually not more than 5% by weight.

The tetrafluoroethylene polymer (C') can be prepared by any polymerization method, and those prepared by emulsion polymerization are particularly preferable. The tetrafluoroethylene polymer prepared by emulsion polymerization readily turns into fibers to have a network structure in the polylactic acid (A). This structure probably effectively serves to improve the melt tension of the resin composition containing the polylactic acid (A).

To uniformly disperse the tetrafluoroethylene polymer (C') in the polylactic acid (A), particles of the tetrafluoroethylene polymer (C') modified with a polymer having good affinity with the polylactic acid (A), such as a (meth)acrylate polymer, may be used. Examples of such a tetrafluoroethylene polymer (C') include acrylic-modified polytetrafluoroethylene.

The fluorine-containing polymer (C) [such as the tetrafluoroethylene polymer (C')] can have any weight average molecular weight. The weight average molecular weight is usually 1000000 to 10000000, preferably 2000000 to 8000000.

Commercially available products may be used as the fluorine-containing polymer (C) [such as the tetrafluoroethylene polymer (C')]. Examples of commercially available products of polytetrafluoroethylene include trade names "Fluon CD-014," "Fluon CD-1," and "Fluon CD-145" made by ASAHI GLASS CO., LTD. Examples of commercially available products of acrylic-modified polytetrafluoroethylene include METABLEN A series such as trade names "METABLEN A-3000" and "METABLEN A-3800" made by MITSUBISHI RAYON CO., LTD.

The polylactic acid film or sheet can contain the fluorine-containing polymer (C) [particularly, the tetrafluoroethylene polymer (C')] in any content. For example, the polylactic acid film or sheet can contain 0.5 to 15 parts by weight of the fluorine-containing polymer (C) based on 100 parts by weight of the polylactic acid (A) (or a composition comprising the polylactic acid (A) and the reforming agent (E) when the reforming agent (E) is contained). The content of the fluorine-containing polymer (C) is preferably 0.7 to 10 parts by weight, more preferably 1 to 5 parts by weight from the viewpoint of the effect of improving melt tension, maintenance of the degree of biomass, and achievement of a good surface state. If the content of the fluorine-containing polymer (C) [particularly, content of the tetrafluoroethylene polymer (C')] is less than 0.5 parts by weight, the effect of improving melt tension is difficult to attain. If the content is more than 15 parts by weight, the effect according to the amount of addition cannot be attained, and the degree of biomass reduces.

The polylactic acid film or sheet can be produced by any specific method, and examples thereof include (1) forming the resin composition containing the polylactic acid (A) into a film by a melt film forming method such as calendering film formation, (2) forming a resin composition comprising the polylactic acid (A) and a crystallization promoter into a film, and (3) a combination thereof. The melt film forming method will be described later.

The crystallization promoter other than the fluorine-containing polymer usable as the crystallization promoter [such as the tetrafluoroethylene polymer (C')] among the fluorine-containing polymers (C) can be used as the crystallization promoter. Such a crystallization promoter [referred to as crystallization promoter (D) in some cases] can be used without limitation as long as it is found to have the effect of promoting crystallization. Desirably, a substance having a crystal structure with a plane interval close to the plane interval of the crystal lattice of the polylactic acid (A) is selected. This is because as the plane interval of the crystal lattice of the substance is closer to the plane interval of the crystal lattice of the polylactic acid (A), the substance has a high effect as the nucleator for the polylactic acid (A). Examples of such a crystallization promoter (D) include organic substances such as polyphosphoric acid melamine, melamine cyanurate, zinc phenyl phosphonate, calcium phenyl phosphonate, and magnesium phenyl phosphonate; and inorganic substances such as talc and clay. Among these, zinc phenyl phosphonate is preferable because this substance has a plane interval closest to the plane interval of the polylactic acid (A) to attain a good effect of promoting crystallization. These crystallization promoters (D) may be used singly or in combinations of two or more.

Commercially available products can be used as the crystallization promoter (D). Examples of commercially available products of zinc phenyl phosphonate include trade name "ECOPROMOTE" made by Nissan Chemical Industries, Ltd.

The polylactic acid film or sheet can contain the crystallization promoter (D) in any content. For example, the polylactic acid film or sheet contains 0.1 to 15 parts by weight of the crystallization promoter (D) based on 100 parts by weight of the polylactic acid (A) (or a composition comprising the polylactic acid (A) and the reforming agent (E) when the reforming agent (E) is contained). The content is preferably 0.3 to 10 parts by weight from the viewpoint of a high effect of promoting crystallization and maintenance of the degree of biomass. At a content of the crystallization promoter (D) less than 0.1 parts by weight, the effect of promoting crystallization is difficult to attain. At a content more than 15 parts by weight, the effect according to the amount of addition cannot be attained, and the degree of biomass reduces. When 0.1 to 15 parts by weight of the tetrafluoroethylene polymer (C') as the fluorine-containing polymer (C) is used based on 100 parts by weight of the polylactic acid (A) (or a composition comprising the polylactic acid (A) and the reforming agent (E) when the reforming agent (E) is contained), the content of the crystallization promoter (D) is preferably 0.1 to 5 parts by weight, more preferably 0.3 to 3 parts by weight based on 100 parts by weight of the polylactic acid (A) (or a composition comprising the polylactic acid (A) and the reforming agent (E) when the reforming agent (E) is contained) from the viewpoint of a high effect of promoting crystallization and maintenance of the degree of biomass. In this case, at a content of the crystallization promoter (D) less than 0.1 parts by weight, the effect of promoting crystallization is difficult to attain. At a content more than 5 parts by weight, the effect according to the amount of addition cannot be attained, and the degree of biomass reduces.

In the present invention, the polylactic acid film or sheet has a tear strength of not less than 100 N/mm, preferably not less than 150 N/mm when the film or sheet is torn at least in the flow direction (MD). If the polylactic acid film or sheet having such a tear strength is used as the substrate for the pressure-sensitive adhesive tape or the like, the substrate does not break or tear during producing or processing the pressure-sensitive adhesive tape or the like including a step of applying tension. The substrate does not break or tear during winding of the pressure-sensitive adhesive tape or the like into a roll or a process such punching.

In the present invention, the tear strength can be determined according to JIS K7128-3: Plastics—Film and Sheeting—Determination of Tear Resistance, Part 3: Right angled tear method. As described above, the polylactic acid film or sheet having a tear strength of not less than 100 N/mm when the film or sheet is torn at least in the flow direction (MD) does not break or tear not only during production of the film or sheet but also during winding thereof into a roll or processing thereof. This property enables various processes, widening its application range significantly.

In the present invention, the polylactic acid film or sheet has a rate of dimensional change due to heating of not more than ±3%, preferably not more than ±2%, not more than ±1% in the flow direction (MD) and the transverse direction (TD). When the polylactic acid film or sheet having such a rate of dimensional change due to heating is used as the substrate for the pressure-sensitive adhesive tape or the like, the film or sheet does not melt or deform under high temperature conditions more than 100° C., for example, and can be sufficiently used in applications requiring heat resistance.

In the present invention, when the film or sheet is stored under an atmosphere at 100° C. for 1 minute, the rate of dimensional change due to heating is determined by Expression (1):

$$\text{rate of dimensional change due to heating (\%)} = (L2-L1)/L1 \times 100 \quad (1)$$

where L1 represents a gauge length before a test, and L2 represents a gauge length after the test.

In the present invention, the polylactic acid film or sheet has a rate of dimensional change due to loaded heating of not more than ±3%, preferably not more than ±2%, not more than ±1% in the flow direction (MD) and the transverse direction (TD). When the polylactic acid film or sheet having such a rate of dimensional change due to loaded heating is used as the substrate for the pressure-sensitive adhesive tape or the like, the film or sheet does not melt or deform under high temperature conditions of more than 100° C., for example, and can be sufficiently used in applications requiring heat resistance.

In the present invention, when the film or sheet is stored under an atmosphere at 100° C. for 1 minute while a load of 300 g/mm$^2$ is applied in the flow direction (MD), the rate of dimensional change due to loaded heating is determined by Expression (2):

$$\text{rate of dimensional change due to loaded heating (\%)} = (L4-L3)/L3 \times 100 \quad (2)$$

where L3 represents a gauge length before a test, and L4 represents a gauge length after the test.

In the present invention, examples of a specific method for further improving physical properties of the polylactic acid film or sheet include a method of compounding the reforming agent (E) with the polylactic acid (A) to prepare a resin composition and forming the resin composition into a film.

Examples of the reforming agent (E) include polyglycerol fatty acid esters or polyglycerol condensed hydroxy fatty acid esters (a), core-shell-structured polymers (b) composed of a particulate rubber and a graft layer formed on the outside of the rubber, and soft aliphatic polyesters (c). These may be each used singly or in combinations of two or more.

In the present invention, the polylactic acid film or sheet contains the polyglycerol fatty acid ester and/or polyglycerol condensed hydroxy fatty acid ester (a) as the reforming agent (E) such that the weight ratio of the polylactic acid (A) to the polyglycerol fatty acid ester and/or polyglycerol condensed hydroxy fatty acid ester (a) is preferably 99:1 to 80:20 ((A):total amount of (a)), more preferably 95:5 to 90:10 ((A):total amount of (a)). These polyglycerol fatty acid esters and polyglycerol condensed hydroxy fatty acid esters may be each used singly or in combinations of two or more.

An excessively small amount of the polyglycerol fatty acid ester and/or polyglycerol condensed hydroxy fatty acid ester (a) leads to an insufficient effect of reforming physical properties. An excessively large amount of the polyglycerol fatty acid ester and/or polyglycerol condensed hydroxy fatty acid ester (a) readily reduces the degree of crystallization and the rate of crystallization, and may cause the polyglycerol fatty acid ester and/or polyglycerol condensed hydroxy fatty acid ester (a) to bleed out. When the polylactic acid film or sheet containing the polyglycerol fatty acid ester or polyglycerol condensed hydroxy fatty acid ester (a) in the above range is used as the substrate for the pressure-sensitive adhesive tape or the like, tear resistance can be improved without reducing heat resistance.

In the polyglycerol fatty acid ester or polyglycerol condensed hydroxy fatty acid ester (a), polyglycerol fatty acid ester is prepared by a reaction of polyglycerol with fatty acid. Examples of the constituent of the polyglycerol fatty acid ester, i.e., polyglycerol, include diglycerol, triglycerol, tetraglycerol, pentaglycerol, hexaglycerol, heptaglycerol, octaglycerol, nonaglycerol, decaglycerol, and dodecaglycerol. These are used singly or as a mixture. The average degree of polymerization of polyglycerol is preferably 2 to 10.

For the other constituent of the polyglycerol fatty acid ester, i.e., fatty acid, fatty acids having not less than 12 carbon atoms are used, for example. Specific examples of the fatty acids include lauric acid, myristic acid, palmitic acid, stearic acid, oleic acid, linoleic acid, linolenic acid, eicosadienoic acid, arachidonic acid, behenic acid, erucic acid, ricinoleic acid, 12-hydroxystearic acid, and hydrogenated castor oil fatty acids. These are used singly or as a mixture.

Polyglycerol condensed hydroxy fatty acid ester is prepared by a reaction of polyglycerol and condensed hydroxy fatty acid. Examples of the constituent of the polyglycerol condensed hydroxy fatty acid ester, i.e., polyglycerol include those exemplified as the constituent of the polyglycerol fatty acid ester.

The condensed hydroxy fatty acid as the other constituent of the polyglycerol condensed hydroxy fatty acid ester is a condensed product of a hydroxy fatty acid. Any hydroxy fatty acid having one or more hydroxyl groups in the molecule can be used, and examples thereof include ricinoleic acid, 12-hydroxystearic acid, and hydrogenated castor oil fatty acids. The degree of condensation of condensed hydroxy acid is, for example, not less than 3, preferably 3 to 8. The condensed hydroxy fatty acids are used singly or as a mixture.

Commercially available products can be used as the polyglycerol fatty acid ester and the polyglycerol condensed hydroxy fatty acid ester. Examples of commercially available products of the polyglycerol fatty acid ester include Chirabasol series such as trade names "Chirabasol VR-10" and "Chirabasol VR-2" made by Taiyo Kagaku Co., Ltd.

In the present invention, the polylactic acid film or sheet contains the core-shell-structured polymer (b) composed of a particulate rubber and a graft layer formed on the outside of the rubber as the reforming agent (E) such that the weight ratio of the polylactic acid (A) to the core-shell-structured polymer (b) composed of a particulate rubber and a graft layer formed on the outside of the rubber is preferably 99:1 to 80:20 ((A):(b)), more preferably 97:3 to 90:10 ((A):(b)). The core-shell-structured polymers (b) composed of a particulate rubber and a graft layer formed on the outside of the rubber may be used singly or in combinations of two or more.

An excessively small amount of the core-shell-structured polymer (b) composed of a particulate rubber and a graft layer formed on the outside of the rubber leads to an insufficient effect of reforming physical properties. An excessively large amount of the core-shell-structured polymer (b) composed of a particulate rubber and a graft layer formed on the outside of the rubber readily reduces the degree of crystallization and the rate of crystallization, and may cause the core-shell-structured polymer (b) composed of a particulate rubber and a graft layer formed on the outside of the rubber to bleed out. When the polylactic acid film or sheet containing the core-shell-structured polymer (b) composed of a particulate rubber and a graft layer formed on the outside of the rubber in the above range is used as the substrate for the pressure-sensitive adhesive tape or the like, tear resistance can be improved without reducing heat resistance.

Examples of the particulate rubber that forms the core in the core-shell-structured polymer (b) composed of a particulate rubber and a graft layer formed on the outside of the rubber include acrylic rubbers, butadiene rubbers, and silicone-acrylic composite rubbers. Examples of a polymer that forms the shell include styrene resins such as polystyrene, and acrylic resins such as polymethyl methacrylate.

The average particle size of the core-shell-structured polymer (a set of primary particles) is, for example, 50 to 500 μm, preferably 100 to 250 μm. When this polymer is compounded with the polylactic acid (A) and is melt kneaded, its primary particles are dispersed. The primary particles have an average particle size of 0.1 to 0.6 μm, for example.

Commercially available products can be used as the core-shell-structured polymer. Examples of commercially available products of the core-shell-structured polymer include PARALOID series (particularly, PARALOID EXL series) such as trade name "PARALOID EXL2315" made by Rohm and Haas Japan K.K., and METABLEN S type such as trade name "METABLEN S-2001," METABLEN W type such as trade name "METABLEN W-450A," METABLEN C type such as trade name "METABLEN C-223A," and METABLEN E type such as trade name "METABLEN E-901" made by MITSUBISHI RAYON CO., LTD.

In the present invention, the polylactic acid film or sheet contains the soft aliphatic polyester (c) as the reforming agent (E) such that the weight ratio of the polylactic acid (A) to the soft aliphatic polyester (c) is preferably 95:5 to 60:40 ((A):(c)), more preferably 90:10 to 80:20 ((A):(c)). The soft aliphatic polyesters (c) may be used singly or in combinations of two or more.

An excessively small amount of the soft aliphatic polyester (c) leads to an insufficient effect of reforming physical properties. An excessively large amount of the soft aliphatic polyester (c) readily reduces the degree of crystallization and the rate of crystallization, and may cause the soft aliphatic polyester (c) to bleed out. When the polylactic acid film or sheet containing the soft aliphatic polyester (c) in the above range is used as the substrate for the pressure-sensitive adhesive tape or the like, tear resistance can be improved without reducing heat resistance.

The soft aliphatic polyester (c) includes aliphatic polyesters and aliphatic and aromatic copolymerization polyesters. The soft aliphatic polyester (c) (aliphatic polyesters and aliphatic and aromatic copolymerization polyesters) is prepared from a polyhydric alcohol such as diol and a polyvalent carboxylic acid such as dicarboxylic acid, and examples thereof include polyesters comprising at least an aliphatic diol as diol and at least an aliphatic dicarboxylic acid as dicarboxylic acid; and polymers of aliphatic hydroxycarboxylic acids having not less than 4 carbon atoms. Examples of the aliphatic diol include aliphatic diols having 2 to 12 carbon atoms (including alicyclic diols) such as ethylene glycol, 1,2-propanediol, 1,3-propanediol, 2,2-dimethyl-1,3-propanediol, 1,2-butanediol, 1,4-butanediol, neopentyl glycol, 1,5-pentanediol, 1,6-hexanediol, cyclohexanediol, 1,3-cyclohexanedimethanol, and 1,4-cyclohexanedimethanol. Examples of the aliphatic dicarboxylic acid include saturated aliphatic dicarboxylic acid having 2 to 12 carbon atoms (including alicyclic dicarboxylic acids) such as succinic acid, malonic acid, glutaric acid, adipic acid, pimelic acid, suberic acid, azelaic acid, sebacic acid, dodecanedioic acid, 1,3-cyclohexanedicarboxylic acid, and 1,4-cyclohexanedicarboxylic acid. In the polyesters comprising at least an aliphatic diol as the diol component and at least an aliphatic dicarboxylic acid as the dicarboxylic acid component, the proportion of the aliphatic diol to the entire diol component is, for example, not less than 80% by weight, preferably not less than 90% by weight, more preferably not less than 95% by weight. Besides the aliphatic diol, aromatic diol or the like may be contained. In the polyesters comprising at least an aliphatic diol as the diol component and at least an aliphatic dicarboxylic acid as the dicarboxylic acid component, the proportion of the aliphatic dicarboxylic acid to the entire dicarboxylic acid component is for example, not less than 20% by weight, preferably not less than 30% by weight, more preferably not less than 50% by weight. Besides the aliphatic dicarboxylic acid, aromatic dicarboxylic acid (such as terephthalic acid) may be contained. Examples of the aliphatic hydroxycarboxylic acid having not less than 4 carbon atoms include hydroxycarboxylic acids having 4 to 12 carbon atoms such as hydroxybutyric acid, hydroxyvaleric acid, hydroxypentanoic acid, hydroxyhexanoic acid, hydroxydecanoic acid, and hydroxydodecanoic acid. The soft aliphatic polyester (c) (aliphatic polyesters and aliphatic and aromatic copolymerization polyesters) has a weight average molecular weight of, for example, 50000 to 400000, preferably 80000 to 250000.

Typical examples of the soft aliphatic polyester (c) include polybutylene succinate, polyethylene succinate adipate, polyethylene succinate, polyethylene succinate adipate, polybutylene adipate terephthalate, polybutylene sebacate terephthalate, and polyhydroxylalkanoate.

Commercially available products can be used as the soft aliphatic polyester (c). Examples of polybutylene succinate include trade name "GS Pla AZ91T" made by Mitsubishi Chemical Corporation, examples of polybutylene succinate adipate include trade name "GS Pla AD92W" made by Mitsubishi Chemical Corporation, and examples of polybutylene adipate terephthalate include trade name "Ecoflex" made by BASF Japan Ltd.

In the present invention, the polylactic acid film or sheet may optionally contain a variety of additives in the range not to impair the effects of the present invention. Examples of such additives include antioxidants, ultraviolet absorbing agents, plasticizers, stabilizers, mold release agents, antistatic agents, colorants (such as white pigments), drip preventing agents, flame retardants, hydrolysis preventing agents, foaming agents, and fillers.

In the present invention, the polylactic acid film or sheet, which has high degree of crystallization, also has high solvent resistance. For example, the polylactic acid film or sheet has a degree of swelling of for example, not more than 2.5, preferably not more than 2.0 to any solvent of ethyl acetate and toluene. The degree of swelling can be determined as follows: A film or sheet sample (50 mm×50 mm×thickness of 0.05 mm) is immersed in a solvent for 15 minutes, and is taken out from the solvent; then, the solvent on the surface of the sample is removed with a waste cloth, and the weight of the sample after immersion is divided by that before immersion.

In the present invention, the polylactic acid film or sheet can also maintain high mechanical properties such as rigidity and high elasticity. For example, the polylactic acid film or sheet in the present invention has an initial elastic modulus of usually not less than 1000 MPa, preferably not less than 1500 MPa in the flow direction (MD). The upper limit of the initial elastic modulus is typically approximately 3500 MPa (for example, approximately 3000 MPa) in the flow direction (MD). The polylactic acid film or sheet in the present invention has a breaking strength of usually not less than 30 MPa, preferably not less than 35 MPa in the flow direction (MD). The upper limit of the breaking strength is typically approximately 150 MPa (for example, approximately 120 MPa).

The polylactic acid film or sheet in the present invention has an elongation of usually not less than 2.5%, preferably not less than 3.5% in the flow direction (MD). The upper limit of the elongation is typically approximately 15% (for example, approximately 12%) in the flow direction (MD). When the soft aliphatic polyester (c) is used as the reforming agent (E), the polylactic acid film or sheet has an elongation of usually not less than 5%, preferably not less than 10%, more preferably not less than 20% in the flow direction (MD). The upper limit of the elongation is typically 150%, preferably 120%, more preferably 100% in the flow direction (MD).

The initial elastic modulus, the breaking strength, and the elongation were determined with a tensile tester according to JIS K 7161: Plastics—Determination of tensile properties.

apparatus: tensile tester (Autograph AG-20kNG, manufactured by SHIMADZU Corporation)

sample size: thickness of 0.05 mm×width of 10 mm×length of 100 mm (a sample was cut out such that the direction of the sample parallel to the length direction of the film or sheet corresponded to the flow direction (MD) in film formation)

measurement condition:
distance between chucks: 50 mm
tensile rate: 300 mm/min

In the present invention, the polylactic acid film or sheet can have any thickness, which is usually 10 to 500 μm, preferably 20 to 400 μm, more preferably 30 to 300 μm.

[Method of Producing Polylactic Acid Film or Sheet]

The method of producing a polylactic acid film or sheet in the present invention is a method of producing a polylactic acid film or sheet wherein a resin composition containing polylactic acid (A) is formed into a film by a melt film forming method, the method comprising:

a melt film forming step of melt forming the resin composition, a cooling solidifying step of cooling and solidifying the resin composition after the melt film forming step to prepare a film or sheet, and a crystallization promoting step of heating the film or sheet after the cooling solidifying step to promote crystallization of the film or sheet, wherein a resin temperature in the melt film forming step is within the range of (Tm)−15° C. to (Tm)+15° C. where Tm represents a melting temperature of the resin composition during raising of temperature, and in at least part of the crystallization promoting step, crystallization of the film or sheet is promoted within the temperature range of (Tc)+10° C. to (Tc)+50° C. where Tc represents a crystallization temperature of the resin composition during the raising of temperature.

For example, the polylactic acid film or sheet can be produced with a continuous melt kneader with a twin screw extruder or the like, or a batch type melt kneader such as a pressure kneader, a Banbury mixer, a roll kneader by uniformly dispersing the components to prepare a resin composition containing the polylactic acid (A), forming the resin composition into a film by extrusion such as a T die method and an inflation method, calendering, or polishing, and cooling and solidifying the film. The melt film forming method is a method in which preferably a melt resin composition is passed through between two metal rolls to be formed into a film of a desired thickness. The method is more preferably calendering or polishing, particularly preferably calendering.

The resin temperature in the melt film forming step is within the range of (Tm)−15° C. to (Tm)+15° C., preferably (Tm)−15° C. to (Tm)+5° C., more preferably (Tm)−10° C. to (Tm), particularly preferably (Tm)−5° C. to (Tm) where Tm represents a melting temperature of the resin composition during raising of temperature.

In particular, when the resin composition does not contain the reforming agent (E), the resin temperature is within the range of preferably (Tm)−15° C. to (Tm)+5° C., more preferably (Tm)−10° C. to (Tm) where Tm represents a melting temperature of the resin composition during raising of temperature.

In particular, when the resin composition further contains the reforming agent (E), the resin temperature is within the range of preferably (Tm)−10° C. to (Tm)+5° C., more preferably (Tm)−5° C. to (Tm) where Tm represents a melting temperature of the resin composition during raising of temperature.

The resin temperature set within such a range attains an effect of suppressing oriented crystallization during film formation.

In particular, from the viewpoint of consistent control to be a predetermined temperature, it is desired that in the melt film forming step, the resin composition be contacted with a metal roll having a predetermined surface temperature. Accordingly, also in the step, the resin composition containing the polylactic acid (A) is desirably formed of a composition readily peelable from the metal roll. From the viewpoint, addition of the acidic functional group-modified olefin polymer (B) is preferable.

The method of producing a polylactic acid film or sheet in the present invention preferably comprises a residual stress relaxing step after the melt film forming step and before the cooling solidifying step, the step of keeping the resin composition within a predetermined temperature range to relax the residual stress of the resin composition. The predetermined temperature (residual stress relaxing temperature) can be any temperature, for example, within the temperature range of (Tm)−70° C. to (Tm)−20° C., preferably (Tm)−60° C. to (Tm)−20° C., more preferably (Tm)−60° C. to (Tm)−23° C., still more preferably (Tm)−50° C. to (Tm)−25° C., particularly preferably (Tm)−50° C. to (Tm)−30° C.

In particular, when the resin composition does not contain the reforming agent (E), the residual stress relaxing temperature is within the temperature range of preferably (Tm)−60° C. to (Tm)−23° C., more preferably (Tm)−50° C. to (Tm)−30° C.

In particular, when the resin composition further contains the reforming agent (E), the residual stress relaxing temperature is within the temperature range of preferably (Tm)−60° C. to (Tm)−20° C., more preferably (Tm)−60° C. to (Tm)−23° C., still more preferably (Tm)-50° C. to (Tm)−25° C., particularly preferably (Tm)−50° C. to (Tm)−30° C. The preferred temperature range may depend on types of the reforming agent (E) or the like.

The residual stress relaxing temperature set within such a range further enhances the effect of relaxing the residual stress and further reduces the risk of extremely thermally shrinking the prepared film or sheet during usage. This setting of the residual stress relaxing temperature enables the resultant crystallized film or sheet to keep the shape up to a temperature close to the melting point of polylactic acid. Such a film or sheet can be sufficiently used in applications requiring heat resistance, in which the film or sheet have not been able to be used. The residual stress relaxing step can use any specific method of keeping the resin composition at a predetermined temperature. Examples thereof include a method of contacting a film sample with a take-off roll kept at a predetermined temperature.

In at least part of the crystallization promoting step, crystallization of the film or sheet is promoted within the temperature range of (Tc)+10° C. to (Tc)+50° C. where Tc represents a crystallization temperature of the resin composition during the raising of temperature. Crystallization of the film or sheet is promoted within the temperature range of preferably (Tc)+20° C. to (Tc)+45° C., more preferably (Tc)+20° C. to (Tc)+40° C. where Tc represents a crystallization temperature of the resin composition during the raising of temperature. The crystallization temperature set within such a temperature range further improves the effect of promoting crystallization to improve a production rate.

In particular, from the viewpoint of consistent control to be a predetermined temperature, it is desired that in the crystallization promoting step, the film or sheet be contacted with a metal roll having a predetermined surface temperature. Accordingly, also in the step, the film or sheet is desirably formed of a composition readily peelable from the metal roll. From the viewpoint, addition of the acidic functional group-modified olefin polymer (B) is preferable.

The time for the crystallization promoting step is preferably as long as possible. The time depends on the degree of crystallization of the resin composition as a conclusion and cannot be specified in general. The time is usually 10 to 120 seconds, preferably 20 to 90 seconds, more preferably 30 to 60 seconds.

In the crystallization promoting step, an optimal temperature condition for the crystallization promoting step can always be obtained, even if the crystallization temperature (Tc) changes due to addition of an additional nucleator or the like during lowering of temperature of the resin composition, by determining the temperature at the highest exothermic peak accompanied by crystallization during lowering of temperature in advance in the measurement with a differential scanning calorimeter (DSC). At this time, it is barely necessary to consider changes in the shape of the film or sheet prepared which are caused by heating at the temperature. Preferably, the temperature attains a film or sheet having a thermal deformation rate of not more than 40%.

Before and/or after the crystallization promoting step, monoaxial or twin-axial drawing (preferably twin-axial drawing) may be performed. The drawing may further increase crystallization. The drawing temperature is, for example, 60 to 100° C.

In the method of producing a polylactic acid film or sheet comprising the crystallization promoting step, the steps from the melt film forming step to the cooling solidifying step are continuously performed. This continuous mode is preferable for a reduction in the process time, and thus productivity. More preferably, the crystallization step is provided continuously subsequent to the cooling solidifying step (for example, the film or sheet is passed through a heat roll). Examples of such a method include methods using a calendering film forming machine, a polishing film forming machine, or the like.

[Calendering Film Formation]

A schematic view of an example of a calendering film forming machine used in the production method will be shown in FIG. 1. Hereinafter, FIG. 1 will be described in detail.

While a first roll 1, a second roll 2, a third roll 3, and a fourth roll 4 are being controlled, a melt resin composition is rolled between these four calender rolls to be gradually thinned, and is controlled to have a desired thickness finally when the resin composition is passed through between the third roll 3 and the fourth roll 4. In the calendering film formation, film formation of the resin composition from the first roll 1 to the fourth roll 4 corresponds to the "melt film forming step." A take-off roll 5 represents a group of rolls contacted by a resin composition 8 formed into a film by melt film forming first. The take-off roll 5 includes one or two or more (three in FIG. 1) rolls, which peel off the melt resin composition 8 from the fourth roll 4. When the take-off roll 5 includes a plurality of rolls as above and the temperatures of the respective rolls can be controlled, the temperatures of the respective rolls are preferably the same. The temperatures may be different if the temperatures fall within a desired temperature range.

The take-off roll 5 contacts with the film sample to relax the residual stress (residual stress relaxing step). At this time, the (three in FIG. 1) take-off rolls often have approximately the same surface temperature, which is the stress relaxing temperature (° C.). The three take-off rolls may have different temperatures. In this case, preferably, the temperatures of these take-off rolls are within the temperature range above.

Two cooling rolls 6 and 7 cool the resin composition 8 when the resin composition 8 is passed through between these rolls, thereby to solidify the resin composition 8 and mold the surface into a desired shape (cooling solidifying step). For this reason, typically, one roll (for example, cooling roll 6) is a metal roll having a designed surface to produce the shape of the surface of the resin composition 8, and the other roll (for example, cooling roll 7) is a rubber roll. Arrows in the drawing represent rotational directions of the respective rolls. A bank 9 (resin pool) is shown.

Subsequently, the cooled and solidified film is heated with a heat roll not shown in FIG. 1 controlled to be any temperature to promote crystallization (crystallization promoting step).

[Polishing Film Formation]

A schematic view of an example of a polishing film forming machine used in the production method will be shown in FIG. 2. Hereinafter, FIG. 2 will be described in detail.

A tip 10 of an extruder (not shown) is disposed between a second roll 2 and a third roll 3 heated, and a melt resin composition 8 is continuously extruded between the second roll 2 and the third roll 3 at a preset extrusion rate. The extruded resin composition 8 is rolled between the second roll 2 and the third roll 3 to be thinned, and is controlled to have a desired thickness finally when the resin composition 8 is passed through between the third roll 3 and the fourth roll 4. In polishing film formation, the film formation of the resin composition 8 from the second roll 2 to the fourth roll 4 corresponds to the "melt film forming step." Subsequently, the resin composition 8 is passed through one or two or more (three in FIG. 2) take-off rolls 5 (residual stress relaxing step), and finally passed through the cooling roll (cooling rolls 6 and 7 in FIG. 2) (cooling solidifying step) to prepare a solidified film or sheet.

Subsequently, the cooled and solidified and formed film is heated with a heat roll not shown in FIG. 2 controlled to be any temperature to promote crystallization (crystallization promoting step).

In the present invention, to enhance the adhesion to an adjacent layer, the surface of the substrate for the pressure-sensitive adhesive tape or the like may be optionally subjected to a standard surface treatment, for example, an oxidation treatment by a chemical or physical method, such as chromic acid treatment, exposure to ozone, exposure to flame, exposure to high voltage electric shock, and ionization radiation treatment.

The film or sheet according to the present invention can be used in broad applications as films or sheets usually used, and can be particularly suitably used as a substrate for the pressure-sensitive adhesive sheets or tapes, a substrate for release liners, and a substrate for protection films or sheets.

When the film or sheet according to the present invention is used as the substrate for the pressure-sensitive adhesive sheets or tapes, to enhance the adhesion to an adjacent layer, the surface of the substrate may be optionally subjected to a standard surface treatment, for example, an oxidation treatment by a chemical or physical method, such as chromic acid treatment, exposure to ozone, exposure to flame, exposure to high voltage electric shock, and ionization radiation treatment.

[Pressure-sensitive Adhesive Layer]

The pressure-sensitive adhesive tape or sheet according to the present invention is a pressure-sensitive adhesive tape or sheet having a pressure-sensitive adhesive layer on at least one surface of a substrate, wherein the substrate is composed of the polylactic acid film or sheet.

The pressure-sensitive adhesive layer can be composed of any known pressure-sensitive adhesive, and examples thereof include rubber pressure-sensitive adhesives, acrylic pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, styrene-diene block copolymer pressure-sensitive adhesives, and creep-improved pressure-sensitive adhesives such as these pressure-sensitive adhesives compounded with hot-melt resins having melting points of not more than approximately 200° C. These known pressure-sensitive adhesives may be used singly or in combinations of two or more. The pressure-sensitive adhesive may be any known pressure-sensitive adhesives such as those of solvent types, those of emulsion types, those of hot-melt types, those of energy beam curable types, and those of heat peeling types.

The pressure-sensitive adhesive typically used are rubber pressure-sensitive adhesives comprising natural rubber or a variety of synthetic rubbers as a base polymer; and acrylic pressure-sensitive adhesives comprising a base polymer composed of an acrylic polymer (homopolymer or copolymer) in which one or two or more alkyl (meth)acrylates are used as monomer components. In the present invention, particularly acrylic pressure-sensitive adhesives comprising an acrylic polymer as a base polymer are preferably used.

Examples of the alkyl (meth)acrylates used as the monomer component for the acrylic polymer include $C_{1-20}$ alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, isodecyl (meth)acrylate, dodecyl (meth)acrylate, tridecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate.

To reform an aggregation force, heat resistance, and crosslinkability, the acrylic polymer may optionally include a unit corresponding to an additional monomer component copolymerizable with the alkyl (meth)acrylate. Examples of such monomer components include (meth)acrylates having an aliphatic cyclic skeleton such as cyclopentyl (meth)acrylate, cyclohexyl (meth)acrylate, cyclohexylmethyl (meth)acrylate, and bornyl (meth)acrylate; (meth)acrylates having an aromatic carbon ring such as phenyl (meth)acrylate and benzyl (meth)acrylate; carboxyl group-containing monomers such as acrylic acid, methacrylic acid, carboxyethyl acrylate, carboxypentyl acrylate, itaconic acid, maleic acid, fumaric acid, and crotonic acid; acid anhydride group-containing monomers such as maleic anhydride and itaconic anhydride; hydroxyl group-containing monomers such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate, and (4-hydroxymethylcyclohexyl)methyl methacrylate; sulfonate group-containing monomers such as styrene sulfonic acid, allyl sulfonic acid, 2-(meth)acrylamide-2-methylpropanesulfonic acid, (meth)acrylamidepropanesulfonic acid, sulfopropyl (meth)acrylate, and (meth)acryloyloxynaphthalenesulfonic acid; (N-substituted)amide-containing monomers such as (meth)acrylamide, N,N-dimethyl(meth)acrylamide, N-butyl(meth)acrylamide, N-methylol(meth)acrylamide, and N-methylolpropane(meth)acrylamide; aminoalkyl (meth)acrylate monomers such as aminoethyl (meth)acrylate, N,N-dimethylaminoethyl (meth)acrylate, and t-butylaminoethyl (meth)acrylate; alkoxyalkyl (meth)acrylate monomers such as methoxyethyl (meth)acrylate and ethoxyethyl (meth)acrylate; maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide; vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic amides, styrene, α-methylstyrene, and N-vinylcaprolactam; cyano group-containing monomers such as acrylonitrile and methacrylonitrile; epoxy group-containing acrylic monomers such as glycidyl (meth)acrylate; glycol acrylic ester monomers such as polyethylene glycol (meth)acrylate, polypropylene glycol (meth)acrylate, methoxyethylene glycol (meth)acrylate, and methoxypolypropylene glycol (meth)acrylate; acrylic acid ester monomers having a hetero ring, a halogen atom, a silicon atom, and the like such as N-(meth)acryloylmorpholine, tetrahydrofurfuryl (meth)acrylate, fluorine (meth)acrylate, and silicone (meth)acrylate; polyfunctional monomers such as hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, epoxy acrylate, polyester acrylate, and urethane acrylate; olefin monomers such as isoprene, butadiene, and isobutylene; and vinyl ether monomers such as vinyl ether. These monomer components may be used singly or in combinations of two or more.

The acrylic polymer can be prepared by a known radical polymerization method such as solution polymerization, bulk polymerization, and emulsion polymerization. The acrylic polymer may be a random copolymer, a block copolymer, a graft polymer, or the like. In polymerization, a polymerization initiator and a chain transfer agent usually used can be used.

The base polymer for the pressure-sensitive adhesive has a weight average molecular weight of, for example, 10000 to 2000000, preferably 300000 to 1500000. The base polymer having an excessively low weight average molecular weight readily contaminates an adherent with a residual adhesive or the like during heat peeling, for example, although such a base polymer attains high followability to the adherent. The base polymer having an excessively high weight average molecular weight will reduce followability to the adherent.

Besides the base polymer, the pressure-sensitive adhesive may optionally contain proper additives such as a crosslinking agent (such as epoxy crosslinking agents, isocyanate crosslinking agents, melamine crosslinking agents, oxazoline crosslinking agents, aziridine crosslinking agents, and metal chelate compounds), a crosslinking promoter (crosslinking catalyst), a tackifier (such as rosin derivative resins, polyterpene resins, petroleum resins, and oil-soluble phenol resins), a thickener, a plasticizer, a filler, a foaming agent, an anti-aging agent, an antioxidant, an ultraviolet absorbing agent, an antistatic agent, a surfactant, a leveling agent, a colorant, a flame retardant, and a silane coupling agent.

The pressure-sensitive adhesive layer can be formed by a known standard method. Examples thereof include a method of applying a pressure-sensitive adhesive composition onto a substrate (intermediate layer when the intermediate layer is disposed on the substrate), and a method of applying a pressure-sensitive adhesive composition onto a proper separator to form a pressure-sensitive adhesive layer, and then transferring (adhering) the pressure-sensitive adhesive layer onto a substrate (intermediate layer when the intermediate layer is disposed on the substrate). Application can be performed with a coater, an extruder, or a printer typically used in formation of the pressure-sensitive adhesive layer.

The pressure-sensitive adhesive layer has a thickness properly selected according to applications or the like, which is, for example, 5 to 3000 μm, preferably approximately 10 to 500 μm.

The pressure-sensitive adhesiveness at 25° C. of the pressure-sensitive adhesive layer (peel by 180°, to a polyethylene terephthalate film, tensile rate: 300 mm/min) can be properly selected according to applications (such as weak pressure-sensitive adhesiveness types and strong pressure-sensitive adhesiveness types) or the like, and is, for example, not less than 3.0 N/20 mm, preferably not less than 5.0 N/20 mm, more preferably not less than 7.0 N/20 mm, and more preferably not less than 10.0 N/20 mm for the strong pressure-sensitive adhesiveness types.

The pressure-sensitive adhesive tape or sheet according to the present invention may optionally include an additional layer (intermediate layer; such as an elasticity layer and a rigid layer) between the substrate and the pressure-sensitive adhesive layer. On the pressure-sensitive adhesive layer, a separator for protecting the pressure-sensitive adhesive layer may be disposed until the pressure-sensitive adhesive tape or sheet is used.

EXAMPLES

Hereinafter, the present invention will be more specifically described using Examples and Comparative Examples. The present invention will not be limited to these. Evaluations in Examples and the like were made as follows.

The following materials were used in Examples and the like.

<Polylactic Acid (A)>
A1: trade name "Terramac TP-4000" (made by Unitika Limited)

<Acidic Functional Group-modified Olefin Polymer (B)>
B1: maleic anhydride group-containing modified polypropylene (weight average molecular weight: 32000, acid value: 52 mgKOH/g, trade name "Umex 1010," made by Sanyo Chemical Industries, Ltd.)

<Fluorine-containing Polymer (C)>
C1: acrylic-modified polytetrafluoroethylene (trade name "METABLEN A-3000," made by MITSUBISHI RAYON CO., LTD.)

<Crystallization Promoter (D)>
D1: zinc phenyl phosphonate (trade name "ECOPROMOTE," made by Nissan Chemical Industries, Ltd.)

<Reforming Agent (E)>
E(a): polyglycerol fatty acid ester (number average molecular weight Mn: 1300, trade name "Chirabasol VR-17," made by Taiyo Kagaku Co., Ltd.)
E(b): core-shell-structured polymer (acrylic rubber/polymethyl methacrylate-styrene core-shell-structured polymer, trade name "PARALOID EXL2315," made by The Dow Chemical Company)
E(c): soft aliphatic polyester (polybutylene adipate terephthalate (trade name "Ecoflex," made by BASF Japan Ltd.)

Examples 1 to 7

Each of resin compositions was prepared in the compounding proportion shown in Table 1 below, and was melt kneaded with a Banbury mixer. By calendering with a calender with four reverse-L shaped rolls, the resin composition was formed into a film to have a thickness of 50 µm (melt film forming step). Next, as shown in FIG. 1, three rolls (take-off roll) heatable to any temperature were disposed immediately after the melt film forming step. The melt film formed resin composition was passed through the three rolls in a staggered manner, and then through cooling rolls to solidify the resin composition. A film was prepared. Subsequently, as shown in Table 1 below, the cooled and solidified and formed film was heated with a heat roll controlled to be any temperature, thereby to promote crystallization (crystallization promoting step).

The temperature of the resin composition in the melt film forming step ("resin temperature in the melt film forming step") was the surface temperature of a roll corresponding to the fourth roll 4 in FIG. 1. The temperature of the resin composition in the crystallization promoting step ("crystallization promoting temperature") was the surface temperature of the heat roll. The film forming rate was 5 m/min.

Comparative Examples 1 to 9

Each of resin compositions was prepared in the compounding proportion shown in Table 2 below in the same manner as in Examples except that the crystallization promoting step was not performed, and was formed into a film by calendering under film forming conditions shown in Table 2 below.

The physical properties of the substrate were determined as follows.

<Melting Temperature (° C.)>
A temperature at the highest endothermic peak accompanied by melting of the resin composition after film formation during re-raising of temperature was measured with a DSC (differential scanning calorimeter). The temperature was defined as a melting temperature (Tm; also referred to as a crystal melting peak temperature).

<Crystallization Temperature (° C.)>
A temperature at the highest exothermic peak accompanied by crystallization of the resin composition after film formation during the raising of temperature from room temperature was measured with a DSC. The temperature was defined as a crystallization temperature (Tc; crystallization temperature during the raising of temperature, also referred to as a crystallization peak temperature).

<Resin Temperature (° C.) in Melt Film Forming Step>
As above, in Examples and Comparative Examples, the surface temperature of the fourth roll was measured, and was defined as the "resin temperature in the melt film forming step" (resin temperature in the melt film forming step).

<Residual Stress Relaxing Temperature (° C.)>
In this embodiment, a film sample was contacted with a take-off roll to relax residual stress. At this time, surface temperatures of three take-off rolls in FIG. 1 (take-off roll temperatures) were approximately the same, and the temperatures were defined as a stress relaxing temperature (° C.). The temperatures of the three take-off rolls may be different if the temperatures fall within the temperature range.

<Crystallization Promoting Temperature (° C.)>
In this embodiment, the formed film was heated with a heat roll controlled to be any temperature, thereby to promote crystallization. The temperature of the heat roll was defined as a crystallization promoting temperature.

<Results of Film Forming Properties>
(1) Plate out to roll: dirt on the surface of the roll was visually evaluated, and was considered "o" (absent) if the surface of the roll had no dirt and "x" (present) if the surface of the roll had dirt.
(2) Peelability: peelability of the melt film formed resin composition from the fourth roll 4 in FIG. 1 was evaluated, and was considered "o" (good) if the resin composition could be taken with the take-off roll 5, and "x" (poor) if the resin composition could not be taken with the take-off roll 5.
(3) State of film surface: the surface of the prepared film was visually observed, and was considered "o" (good) if the film surface was smooth without roughness, and "x" (poor) if the surface of the film had bank marks (depressions and projections caused by uneven flow of the resin), roughness, or pin holes.

<Tear Strength (N/mm)>

Tear strength was measured according to JIS K7128-3: Plastics—Film and Sheeting—Determination of Tear Resistance, Part 3: Right angled tear method. The following apparatus and conditions were used in the measurement.

apparatus: tensile tester (Autograph AG-20kNG, manufactured by SHIMADZU Corporation)

sample size: shape of the test piece according to JIS condition: tensile rate: 200 ram/min The sample used for the evaluation was cut out such that the tear direction of the sample corresponded to the flow direction (hereinafter referred to as MD) in film formation.

Method of calculating tear strength: Expression (3) below was used.

$$T=(F/d) \quad (3)$$

T: tear strength (N/mm)
F: the largest tensile load (N)
d: thickness of the test piece (mm)

<Amount of Crystallization Heat $\Delta Hc'$ (J/g) after Film Formation>

The amount of heat $\Delta Hc$ (J/g) at the exothermic peak accompanied by crystallization of the film sample after film formation during the raising of temperature, and the amount of heat $\Delta Hm$ (J/g) accompanied by melting when the temperature was raised to 200° C., was lowered to 0° C., and was then raised again were measured with a DSC. From the $\Delta Hc$ (J/g) and the $\Delta Hm$ (J/g), $\Delta Hc'$ was calculated using Expression (5) below where $\Delta Hc'$ was the amount of crystallization heat after film formation (amount of melt endotherm in crystallized portions during film formation).

$$\Delta Hc'=\Delta Hm-\Delta Hc \quad (5)$$

The following DSC was used in the measurements of the crystallization temperature, the melting temperature, a relative crystallization rate, and the amount of crystallization heat $\Delta Hc'$ after film formation:

apparatus: DSC6220 manufactured by SII NanoTechnology Inc.

The measurement conditions are:

range of temperature in the measurement: 20° C. to 200° C. to 0° C. to 200° C. (namely, first, the measurement during the raising of temperature from 20° C. to 200° C., followed by the measurement during lowering of temperature from 200° C. to 0° C., finally followed by the measurement during re-raising of temperature from 0° C. to 200° C.)

temperature raising/falling rate: 2° C./min atmosphere for the measurement: under a nitrogen atmosphere (200 ml/min)

No exothermic peak accompanied by crystallization was found during the re-raising of temperature. From this, it was determined that 100% of crystallizable regions was crystallized at the temperature falling rate of 2° C./rain, and adequacy of the calculation expression for the amount of crystallization heat after film formation was confirmed.

<Rate of Dimensional Change Due to Heating>

A film measuring 100 mm×100 mm was cut out, was marked with a gauge line at 50 mm in the flow direction (hereinafter referred to as MD) and the transverse direction (hereinafter referred to as TD) during film formation. The film was placed in an oven heated to 120° C. for 1 minute, and was examined for the dimensional change after the film was extracted.

Method of calculating a rate of dimensional change due to heating; the gauge length L1 before a test and the gauge length L2 after the test were measured, and the rate of dimensional change due to heating was calculated from Expression (1):

$$\text{rate of dimensional change due to heating (\%)}=(L2-L1)/L1\times100 \quad (1)$$

(Evaluation) The dimensional change rates by heating of not more than ±3% in MD and TD are accepted.

<Rate of Dimensional Change Due to Loaded Heating>

A film measuring 100 mm (MD)×20 mm (TD) was cut out, and was marked with a gauge line at 50 mm in MD. While a load of 300 g/mm² was being applied in MD, the film was placed in an oven heated to 100° C. for 1 minute. The dimensional change in MD of the film was examined after the film was extracted.

Method of calculating a rate of dimensional change due to loaded heating; the gauge length L3 before a test and the gauge length L4 after the test were measured, and the rate of dimensional change due to loaded heating was calculated from Expression (2):

$$\text{rate of dimensional change due to heating (\%)}=(L4-L3)/L3\times100 \quad (2)$$

(Evaluation) The rate of dimensional change due to loaded heating of not more than ±3% is accepted.

This evaluation was performed as an alternative evaluation in consideration of a drying step during actual application of the pressure-sensitive adhesive on the premise that the film was wound into a roll while a certain tension was being applied to the film.

Results of evaluation in Examples 1 to 7 and Comparative Examples 1 to 9 are shown in Tables 1 and 2 below. In Example 1 and Comparative Examples 1 to 3 where the reforming agent is not added, Example 1 showed high tear resistance and high heat resistance. In contrast, Comparative Example 1, which includes no crystallization step, shows high tear resistance. Unfortunately, the film in Comparative Example 1 cannot endure heat load deformation due to its low amount of crystallization heat. Comparative Example 2 shows poor tear resistance although high heat resistance is attained by crystallization during film formation. Comparative Example 3 shows poor tear resistance and poor heat resistance because the residual stress is not relaxed due to a low temperature of the take-off roll.

In Examples 2 and 3 and Comparative Examples 4 and 5 where the reforming agent E(a) is added, Examples 2 and 3 showed high tear resistance and high heat resistance. Examples 2 and 3 have tear strength greater than that in Example 1 where the reforming agent is not added, and show the effect of compounding the reforming agent. In contrast, Comparative Example 4, which includes no crystallization step, shows high tear resistance. Unfortunately, the film in Comparative Example 4 cannot endure heat load deformation due to its low amount of crystallization heat. Comparative Example 3 shows poor tear resistance although high heat resistance is attained by crystallization during film formation.

In Examples 4 and 5 and Comparative Examples 6 and 7 where the reforming agent E(b) is added, Examples 4 and 5 showed high tear resistance and high heat resistance. Examples 4 and 5 have tear strength greater than that in Example 1 where the reforming agent is not added, and show the effect of compounding the reforming agent. In contrast, Comparative Example 6, which includes no crystallization step, shows high tear resistance. Unfortunately, the film in Comparative Example 6 cannot endure heat load deformation due to its low amount of crystallization heat.

Comparative Example 5 shows poor tear resistance although high heat resistance is attained by crystallization during film formation.

In Examples 6 and 7 and Comparative Examples 8 and 9 where the reforming agent E(c) is added, Examples 6 and 7 showed high tear resistance and high heat resistance. Examples 6 and 7 have tear strength greater than that in Example 1 where the reforming agent is not added, and show the effect of compounding the reforming agent. In contrast, Comparative Example 8, which includes no crystallization step, shows high tear resistance. Unfortunately, the film in Comparative Example 8 cannot endure heat load deformation due to its low amount of crystallization heat. Comparative Example 7 shows poor tear resistance although high heat resistance is attained by crystallization during film formation.

TABLE 1

| Example | | 1 | 2 | 3 | 4 | 5 | 6 | 7 |
|---|---|---|---|---|---|---|---|---|
| Raw materials (parts by weight) | | | | | | | | |
| | A1 | 100 | 97 | 91 | 90 | 85 | 90 | 70 |
| | B1 | 1 | 1 | 1 | 1 | 1 | 1 | 1 |
| | C1 | 3 | 1 | 3 | 3 | 3 | 3 | 6 |
| | D1 | 1 | 1 | 1 | 1 | 1 | 1 | 1 |
| | E(a) | | 3 | 9 | | | 1 | 1 |
| | E(b) | | | | 10 | 15 | | |
| | E(c) | | | | | | 10 | 30 |
| | Film thickness (μm) | 50 | 50 | 50 | 50 | 50 | 50 | 50 |
| DSC data on resin composition | Melting temperature | 172 | 165 | 165 | 167 | 167 | 167 | 167 |
| | Crystallization temperature (Tc) | 87 | 84 | 84 | 83 | 83 | 85 | 85 |
| Setting temperature (° C.) | Resin temperature in melt film forming step | 162 | 162 | 170 | 162 | 162 | 162 | 162 |
| | Residual stress relaxing temperature | 142 | 120 | 142 | 110 | 142 | 110 | 142 |
| | Crystallization promoting temperature | 120 | 120 | 120 | 120 | 110 | 120 | 110 |
| | Crystallization promoting time (seconds) | 30 | 60 | 30 | 60 | 30 | 60 | 60 |
| Results of film forming properties | Plate out to roll | ○ | ○ | ○ | ○ | ○ | ○ | ○ |
| | Peelability | ○ | ○ | ○ | ○ | ○ | ○ | ○ |
| | State of film surface | ○ | ○ | ○ | ○ | ○ | ○ | ○ |
| Tear strength (N/mm) | MD | 110 | 136 | 152 | 152 | 176 | 141 | 191 |
| Amount of crystallization heat after film formation ΔHc' (J/g) | | 34 | 36 | 30 | 33 | 29 | 29 | 25 |
| Rate of dimensional change due to heating (%) | MD | 0.2 | 0.0 | -1.0 | 0.0 | -0.2 | -0.3 | 0.1 |
| | TD | -0.2 | -0.1 | -0.5 | -0.1 | -0.3 | 0.0 | -0.1 |
| Rate of dimensional change due to loaded heating (%) | MD | 2.0 | 0.0 | 0.0 | 2.0 | 1.0 | 1.2 | 2.8 |

TABLE 2

| Comparative Example | | 1 | 2 | 3 | 4 | 5 | 6 | 7 | 8 | 9 |
|---|---|---|---|---|---|---|---|---|---|---|
| Raw materials (parts by weight) | | | | | | | | | | |
| | A1 | 100 | 100 | 100 | 97 | 94 | 94 | 90 | 85 | 85 |
| | B1 | 1 | 1 | 1 | 1 | 1 | 1 | 1 | 1 | 1 |
| | C1 | 3 | 3 | 5 | 6 | 3 | 2 | 3 | 4 | 4 |
| | D1 | 1 | 1 | 1 | 1 | 1 | 1 | 1 | 1 | 1 |
| | E(a) | | | | 3 | 6 | | | 1 | 1 |
| | E(b) | | | | | | 6 | 10 | | |
| | E(c) | | | | | | | | 15 | 15 |
| | Film thickness (μm) | 50 | 50 | 50 | 50 | 50 | 50 | 50 | 50 | 50 |
| DSC data on resin composition | Melting temperature | 172 | 172 | 172 | 165 | 165 | 167 | 167 | 167 | 167 |
| | Crystallization temperature (Tc) | 87 | 87 | 87 | 84 | 84 | 83 | 83 | 85 | 85 |
| Setting temperature (° C.) | Resin temperature in melt film forming step | 162 | 152 | 152 | 148 | 168 | 150 | 162 | 150 | 162 |
| | Residual stress relaxing temperature | 142 | 142 | 90 | 120 | 110 | 120 | 110 | 120 | 110 |
| | Crystallization promoting temperature | — | — | — | — | — | — | — | — | — |
| | Crystallization promoting time (seconds) | — | — | — | — | — | — | — | — | — |
| Results of film forming properties | Plate out to roll | ○ | ○ | ○ | ○ | ○ | ○ | ○ | ○ | ○ |
| | Peelability | ○ | ○ | ○ | ○ | ○ | ○ | ○ | ○ | ○ |
| | State of film surface | ○ | ○ | ○ | ○ | ○ | ○ | ○ | ○ | ○ |
| Tear strength (N/mm) | MD | 259 | 34 | 32 | 54 | 245 | 82 | 275 | 88 | 283 |
| Amount of crystallization heat after film formation ΔHc' (J/g) | | 18 | 32 | 35 | 37 | 17 | 38 | 17 | 27 | 15 |
| Rate of dimensional change due to heating (%) | MD | -4.1 | -1.3 | -4.3 | -1.2 | -8.0 | -1.8 | -6.2 | -1.7 | -1.2 |
| | TD | -1.4 | -0.1 | 0.5 | 0.1 | -0.5 | 0.3 | 0.1 | -0.1 | -0.6 |
| Rate of dimensional change due to loaded heating (%) | MD | ND* | -1.0 | -5.2 | -1.5 | ND* | -1.0 | ND* | -1.0 | ND* |

*cannot be measured because the sample is completely elongated by load

INDUSTRIAL APPLICABILITY

The polylactic acid film or sheet according to the present invention does not melt or deform even at high temperatures. The polylactic acid film or sheet according to the present invention keeps its intrinsic rigidity and does not break or tear when tension is applied to the film or sheet. Accordingly, the film or sheet is particularly useful as a substrate for pressure-sensitive adhesive sheets or tapes, a substrate for release liners, and a substrate for protection films or sheets.

REFERENCE SIGNS LIST

1 first roll
2 second roll
3 third roll
4 fourth roll
5 take-off roll
6 cooling roll
7 cooling roll
8 resin composition
9 bank (resin pool)
10 tip of extruder

The invention claimed is:

1. A polylactic acid film or sheet comprising polylactic acid (A) and a reforming agent (E),
   wherein the polylactic acid film or sheet comprises polyglycerol fatty acid ester and/or polyglycerol condensed hydroxy fatty acid ester (a) as the reforming agent (E) such that the weight ratio of the polylactic acid (A) to the polyglycerol fatty acid ester and/or polyglycerol condensed hydroxy fatty acid ester (a), (A):total amount of (a), is 99:1 to 80:20,
   wherein a melt flow rate of the polylactic acid (A) at 190° C. and a load of 21.2 N is 0.1 to 50 g/10 min,
   wherein a tear strength, according to JIS K7128-3: Plastics—Film and Sheeting—Determination of Tear Resistance, Part 3: Right angled tear method, is not less than 136 N/mm when the film or sheet is torn in a flow direction (machine direction: MD),
   the film or sheet stored under an atmosphere at 100° C. for 1 minute has a rate of dimensional change due to heating of not more than ±3% in the flow direction (MD) and a transverse direction (TD), the rate of dimensional change due to heating being determined by Expression (1):

$$\text{rate of dimensional change due to heating (\%)} = (L2-L1)/L1 \times 100 \quad (1)$$

where $L1$ represents a gauge length before a first test, and $L2$ represents a gauge length after the first test, and
   the film or sheet stored under an atmosphere at 100° C. for 1 minute while a load of 300 g/mm² is applied in the flow direction (MD) has a rate of dimensional change due to loaded heating of not more than ±3% in the flow direction (MD), the rate of dimensional change due to loaded heating being determined by Expression (2):

$$\text{rate of dimensional change due to loaded heating (\%)} = (L4-L3)/L3 \times 100 \quad (2)$$

where $L3$ represents a gauge length before a second test, and $L4$ represents a gauge length after the second test.

2. The polylactic acid film or sheet according to claim 1, further comprising 0.1 to 10 parts by weight of an acidic functional group-modified olefin polymer (B) based on 100 parts by weight of the polylactic acid (A) and the reforming agent (E), the acidic functional group-modified olefin polymer (B) having an acid value of 10 to 70 mgKOH/g and a weight average molecular weight of 10000 to 80000.

3. The polylactic acid film or sheet according to claim 2, wherein the acidic functional group of the acidic functional group-modified olefin polymer (B) is an acid anhydride group.

4. The polylactic acid film or sheet according to claim 1, further comprising 0.5 to 15 parts by weight of a fluorine-containing polymer (C) based on 100 parts by weight of the polylactic acid (A) and the reforming agent (E).

5. The polylactic acid film or sheet according to claim 4, wherein the fluorine-containing polymer (C) is a tetrafluoroethylene polymer.

6. The polylactic acid film or sheet according to claim 1, further comprising 0.1 to 15 parts by weight of a crystallization promoter (D) based on 100 parts by weight of the polylactic acid (A) and the reforming agent (E).

7. The polylactic acid film or sheet according to claim 1, wherein the polylactic acid film or sheet is a film or sheet formed by a melt film forming method.

8. The polylactic acid film or sheet according to claim 7, wherein the melt film forming method is calendering.

9. The polylactic acid film or sheet according to claim 1, obtained by a process comprising:
   promoting crystallization of the film or sheet within a temperature range of Tc+10° C. to Tc+50° C. for a time period of 10 to 120 seconds, where Tc is a crystallization temperature of the resin composition during a raising of temperature.

* * * * *